United States Patent
Kim et al.

(10) Patent No.: US 10,005,468 B2
(45) Date of Patent: Jun. 26, 2018

(54) APPARATUS AND METHOD FOR ACTIVE VIBRATION CONTROL OF HYBRID ELECTRIC VEHICLE

(71) Applicant: HYUNDAI MOTOR COMPANY, Seoul (KR)

(72) Inventors: Sung Jae Kim, Suwon-si (KR); Jeong Soo Eo, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days. days.

(21) Appl. No.: 15/169,880

(22) Filed: Jun. 1, 2016

(65) Prior Publication Data

US 2017/0166213 A1 Jun. 15, 2017

(30) Foreign Application Priority Data

Dec. 11, 2015 (KR) .................. 10-2015-0177480

(51) Int. Cl.
*B60L 9/00* (2006.01)
*B60L 11/00* (2006.01)
(Continued)

(52) U.S. Cl.
CPC .............. *B60W 30/20* (2013.01); *B60K 6/485* (2013.01); *B60W 10/06* (2013.01); *B60W 10/08* (2013.01);
(Continued)

(58) Field of Classification Search
CPC ...... B60W 10/06; B60W 10/08; B60W 20/15; B60W 2510/06; B60W 2510/0638;
(Continued)

(56) References Cited

U.S. PATENT DOCUMENTS

| | | | | | |
|---|---|---|---|---|---|
| 6,102,144 | A | * | 8/2000 | Lutz | B60K 6/48 180/65.25 |
| 6,246,952 | B1 | * | 6/2001 | Honda | F02P 5/152 123/406.38 |

(Continued)

FOREIGN PATENT DOCUMENTS

| | | |
|---|---|---|
| JP | 2003-202870 A | 7/2003 |
| JP | 2009-247156 A | 10/2009 |
| KR | 10-2010-0064603 | 6/2010 |

*Primary Examiner* — Harry Y Oh
(74) *Attorney, Agent, or Firm* — Brinks Gilson & Lione

(57) ABSTRACT

A method for active vibration control of a hybrid electric vehicle may include: selecting a reference angle signal based on position information of a motor or an engine; generating a reference angle based on information of the reference angle signal; setting up a period of fast Fourier transform (FFT) and analyzing the FFT signal; setting up a reference spectrum according to an engine speed and an engine load; extracting a vibration component from each frequency based on information of the reference spectrum; selecting and adding a removal object frequency from the vibration of each frequency and performing inverse FFT; determining a basic amplitude ratio according to the engine speed and the engine load and an adjustable rate according to the engine load; and performing active vibration control of each frequency based on the information of the basic amplitude ratio, the adjustable rate, and the engine torque.

6 Claims, 3 Drawing Sheets

(51) Int. Cl.
*G05D 1/00* (2006.01)
*G05D 3/00* (2006.01)
*G06F 7/00* (2006.01)
*G06F 17/00* (2006.01)
*B60W 30/20* (2006.01)
*B60W 20/00* (2016.01)
*B60W 50/00* (2006.01)
*B60K 6/485* (2007.10)
*B60W 10/06* (2006.01)
*B60W 10/08* (2006.01)

(52) U.S. Cl.
CPC ........ *B60W 20/00* (2013.01); *B60W 50/0098* (2013.01); *B60W 2030/206* (2013.01); *B60W 2050/0057* (2013.01); *B60W 2510/0657* (2013.01); *B60W 2510/081* (2013.01); *B60W 2510/082* (2013.01); *B60W 2600/00* (2013.01); *B60Y 2300/20* (2013.01); *B60Y 2300/205* (2013.01); *Y02T 10/6226* (2013.01); *Y02T 10/6286* (2013.01)

(58) Field of Classification Search
CPC ... B60W 2510/0657; B60W 2510/081; B60W 2710/0666; B60W 2710/083; B60W 30/025
USPC .......................................................... 701/22
See application file for complete search history.

(56) References Cited

U.S. PATENT DOCUMENTS

| | | | | |
|---|---|---|---|---|
| 7,633,257 | B2* | 12/2009 | Sakamoto | B60W 30/20 318/611 |
| 8,644,521 | B2* | 2/2014 | Christoph | G10K 11/178 381/71.1 |
| 9,533,672 | B2* | 1/2017 | Christ | B60W 10/08 |
| 2009/0251096 | A1* | 10/2009 | Schulz | H02P 6/10 318/801 |
| 2009/0267555 | A1* | 10/2009 | Schulz | H02P 29/50 318/432 |
| 2012/0078456 | A1* | 3/2012 | Hakumura | B60L 3/003 701/22 |

* cited by examiner

APPARATUS AND METHOD FOR ACTIVE VIBRATION CONTROL OF HYBRID ELECTRIC VEHICLE

CROSS-REFERENCE TO RELATED APPLICATION

This application claims priority to and the benefit of Korean Patent Application No. 10-2015-0177480, filed on Dec. 11, 2015, which is incorporated herein by reference in its entirety.

FIELD

The present disclosure relates to an apparatus and a method for active vibration control of a hybrid electric vehicle.

BACKGROUND

The statements in this section merely provide background information related to the present disclosure and may not constitute prior art.

A hybrid vehicle is a vehicle using two or more different kinds of power sources, and is generally a vehicle that is driven by an engine that obtains a driving torque by burning fuel and a motor that obtains a driving torque with battery power.

Hybrid electric vehicles can be provided with optimum output torque, depending on how the engine and the motor are operated while the vehicles are driven by the two power sources, that is, the engine and the motor.

Hybrid electric vehicles may form various structures using the engine and the motor as power sources, and hybrid electric vehicles are classified as a TMED (Transmission Mounted Electric Device) type, in which the engine and the motor are connected by an engine clutch and the motor is connected to the transmission, and an FMED (Flywheel Mounted Electric Device) type, in which the motor is directly connected to a crankshaft of the engine and connected to the transmission through a flywheel.

From among these, since the FMED type of the hybrid electric vehicle is very noisy and has severe vibration, vibration reduction is being studied. A method of frequency analysis which extracts the vibration component is normally used for this.

An analog method using a band pass filter has been used in a conventional frequency analysis, and the analog method of analysis determines whether or not a frequency is abnormal based on an amplitude of each expected point of a frequency band.

However, distinguishing between the vibration component of the engine and the vibration of the noise component is difficult, and unnecessary over-control of the vibration negatively affects control efficiency and energy management. Further, because it is only possible to create and synchronize a reference signal with respect to a specific frequency in the conventional frequency analysis, comprehensive and active control of other frequencies which may be additionally generated is not performed.

SUMMARY

The present disclosure provides an apparatus and a method for active vibration control of a hybrid electric vehicle, having advantages of elaborately controlling an abnormal vibration component through an entire frequency spectrum analysis using FFT (fast Fourier transform) and reflecting a change of a surrounding frequency component in real time by feedback.

One form of the present disclosure provides a method for active vibration control of a hybrid electric vehicle that may include: selecting a reference angle signal based on position information of a motor or an engine; generating a reference angle based on information of the reference angle signal; setting up a period of fast Fourier transform (FFT) and analyzing the FFT signal; setting up a reference spectrum according to an engine speed and an engine load; extracting a vibration component from each frequency based on information of the reference spectrum; selecting and adding a removal object frequency from the vibration of each frequency and performing inverse FFT; determining a basic amplitude ratio according to the engine speed and the engine load and an adjustable rate according to the engine load; and performing active vibration control of each frequency based on the information of the basic amplitude ratio, the adjustable rate, and the engine torque.

The reference angle may be set by dividing by a number (m) of resolver poles based on information of the position of the motor or set up the reference angle between top dead center (TDC) of the number one cylinder and bottom dead center (BDC) of the number four cylinder based on information of the position of the engine.

The FFT period may be set in consideration of a cylinder and a stroke of the engine.

The analysis of the FFT signal may calculate a magnitude and phase information of each frequency.

The vibration component of each frequency may be extracted by comparing the reference spectrum with the FFT signal analysis result.

The vibration component may be removed by summing a reference signal obtained by inverse FFT and a value found by multiplying the engine torque and the basic amplitude ratio and the adjustable rate in the active vibration control of each frequency.

The adjustable rate according to the engine load may be determined to decrease an anti-phase torque when the engine load is greater than or equal to a predetermined load.

Another exemplary form of the present disclosure provides a control apparatus for active vibration control of a hybrid electric vehicle including an engine and a motor as a power source. The control apparatus may include: a position sensor configured to detect position information of the engine or the motor; and a controller configured to select a reference angle signal on the basis of a signal from the position sensor, perform fast Fourier transform (FFT) analysis by generating a reference angle, extract a vibration component of each frequency through the FFT analysis, generate a reference signal by performing inverse FFT, and perform active vibration control of each frequency by reflecting a basic amplitude ratio, an adjustable rate according to an engine load, and an engine torque to the reference signal.

The controller may set up a reference spectrum according to a speed and load of the engine, and extract a vibration component of each frequency by comparing the reference spectrum with the FFT signal analysis result.

The controller may generate a reference signal by performing inverse FFT after selecting and summing a removal object frequency from each frequency vibration through FFT analysis.

The controller may remove the vibration component by summing the reference signal generated by the inverse FFT and a value found by multiplying the basic amplitude ratio, the adjustable rate, and the engine torque.

The controller may set up the reference angle by dividing by a number (m) of resolver poles based on information of the position of the motor or set up the reference angle between top dead center (TDC) of a number one cylinder and bottom dead center (BDC) of a number four cylinder based on information of the position of the engine.

The controller may set up an FFT period in consideration of a cylinder and stroke of the engine, and analyzes the FFT signal by a calculated magnitude and phase information of each frequency.

The controller may determine the adjustable rate according to the engine load to decrease an anti-phase torque when the engine load is greater than or equal to a predetermined load.

As described above, the vibration may be actively controlled, because the exact vibration component of each frequency may be extracted through FFT frequency spectrum analysis. Therefore, since the determination system of the reference angle of the engine and the motor may be utilized as it is, an additional device or an algorithm for signal synchronization as used in the conventional art may be eliminated.

In addition, since the adjustment amount of vibration and frequency which is the object of the vibration control may be controlled individually, it is possible to inhibit inefficienct energy consumption which is from the control when the vibration is over-removed. Particularly, energy consumption during a high load region of the engine can be reduced by decreasing an anti-phase torque comparing to a low load region of the engine. Thus, precise and efficient active control may be performed through the feedback control in real time.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which.

Figure 1:
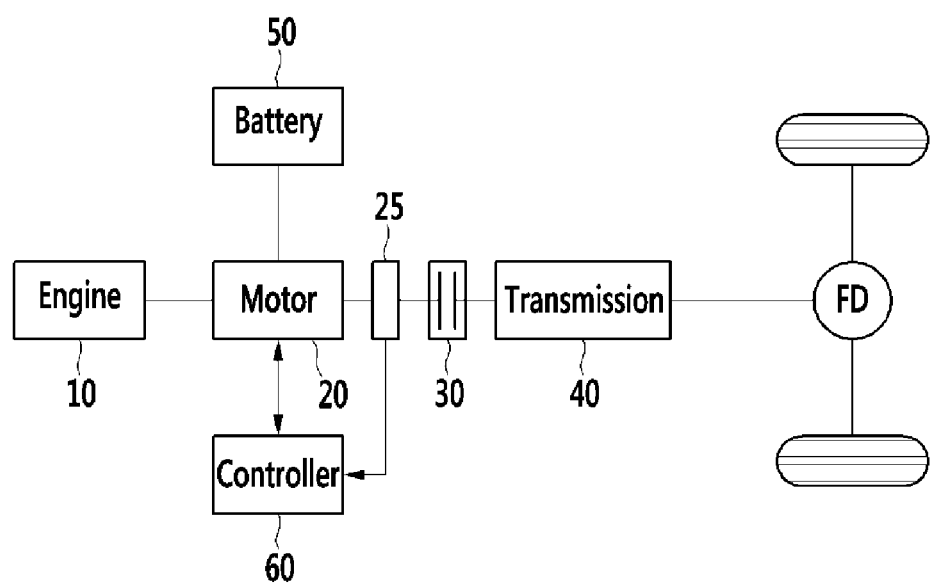
FIG. 1 is a schematic block diagram of an apparatus for active vibration control of a hybrid electric vehicle.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Throughout this specification and the claims which follow, unless explicitly described to the contrary, the word "comprise" and variations such as "comprises" or "comprising" will be understood to imply the inclusion of stated elements but not the exclusion of any other elements.

It is understood that the term "vehicle" or "vehicular" or other similar term as used herein is inclusive of motor vehicles in general including hybrid vehicles, plug-in hybrid electric vehicles, and other alternative fuel vehicles (e.g., fuels derived from resources other than petroleum). As referred to herein, a hybrid electric vehicle is a vehicle that has two or more sources of power, for example both gasoline-powered and electric-powered vehicles.

Additionally, it is understood that some of the methods may be executed by at least one controller. The term "controller" refers to a hardware device that includes a memory and a processor configured to execute one or more steps that should be interpreted as its algorithmic structure. The memory is configured to store algorithmic steps and the processor is specifically configured to execute said algorithmic steps to perform one or more processes which are described further below.

Furthermore, the control logic of the present disclosure may be embodied as non-transitory computer readable media on a computer readable medium containing executable program instructions executed by a processor, a controller, or the like. Examples of computer readable media include, but are not limited to, ROM, RAM, compact disc (CD)-ROMs, magnetic tapes, floppy disks, flash drives, smart cards, and optical data storage devices. The computer readable recording medium can also be distributed in network coupled computer systems so that the computer readable media are stored and executed in a distributed fashion, e.g., by a telematics server or a controller area network (CAN).

FIG. 1 is a schematic block diagram of an apparatus for active vibration control of a hybrid electric vehicle according to one form of the present disclosure.

As shown in FIG. 1, an apparatus for active vibration control of a hybrid electric vehicle includes an engine 10, a motor 20, a position sensor 25, a clutch 30, a transmission 40, a battery 50, and a controller 60.

The engine 10 outputs power by combusting fuel as a power source while turned on. The engine 10 may be a gasoline engine or a diesel engine using conventional fossil fuel. The rotation power generated from the engine 10 is transmitted to the transmission 40 side through the clutch 30.

The motor 20 may be operated by a 3-phase AC voltage applied from the battery 50 through an inverter to generate torque, and operates as a power generator and supplies regenerative energy to the battery 50 in a coast-down mode.

In one form, the motor 20 may be directly connected to the crankshaft of the engine 10.

The position sensor 25 detects position information of the engine 10 or the motor 20. That is, the position sensor 25 may include a crankshaft position sensor that detects a phase of the crankshaft or a motor position sensor that detects a position of a stator and a rotor of the motor.

The clutch 30 is disposed between the motor 20 connected to the crankshaft of the engine 10 and the transmission 40, and switches power delivery to the transmission 40. The clutch 30 may be applied as a hydraulic pressure type of clutch or dry-type clutch.

The transmission 40 adjusts a shift ratio according to a vehicle speed and a running condition, distributes an output torque by the shift ratio, and transfers the output torque to the driving wheel, thereby enabling the vehicle to run. The transmission 40 may be applied as an automatic transmission (AMT) or a dual clutch transmission (DCT).

The battery 50 is formed with a plurality of unit cells, and a high voltage for providing a driving voltage to the motor 20 is stored at the battery 50. The battery 50 supplies the driving voltage to the motor 20 depending on the driving mode, and is charged by the voltage generated from the motor 20 in the regenerative braking.

The controller 60 selects a reference angle signal on the basis of a signal from the position sensor 25, performs fast Fourier transform (FFT) analysis by generating a reference angle, extracts a vibration component of each frequency through the FFT analysis, and generates a reference signal by performing inverse FFT.

After that, the controller 60 performs active vibration control of each frequency by reflecting a basic amplitude ratio, an adjustable rate according to an engine load, and an engine torque to the reference signal.

For these purposes, the controller 60 may be implemented as at least one processor that is operated by a predetermined program, and the predetermined program may be programmed in order to perform each step of a method for active vibration control of a hybrid electric vehicle.

Various forms described herein may be implemented within a recording medium that may be read by a computer or a similar device by using software, hardware, or a combination thereof, for example.

According to hardware implementation, the forms described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electric units designed to perform any other functions.

According to software implementation, forms such as procedures and functions described in the present forms may be implemented by separate software modules. Each of the software modules may perform one or more functions and operations described in the present disclosure. A software code may be implemented by a software application written in an appropriate program language.

Hereinafter, a method for active vibration control of the hybrid electric vehicle according to an exemplary form of the present disclosure will be described in detail with reference to FIG. 2 to FIG. 3.

Figure 2:
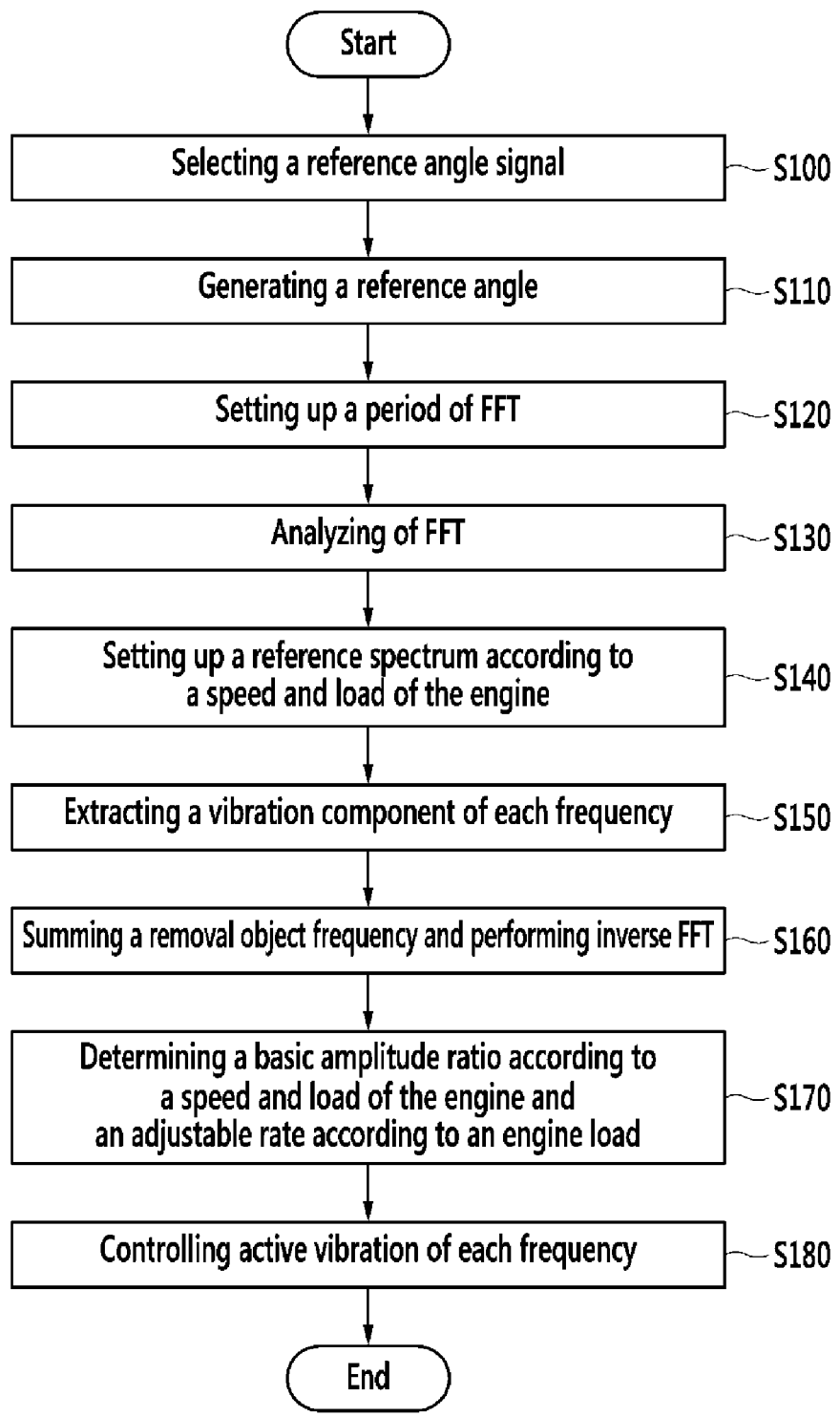
FIG. 2 is a flowchart illustrating a method for active vibration control of a hybrid electric vehicle.
Figure 3:
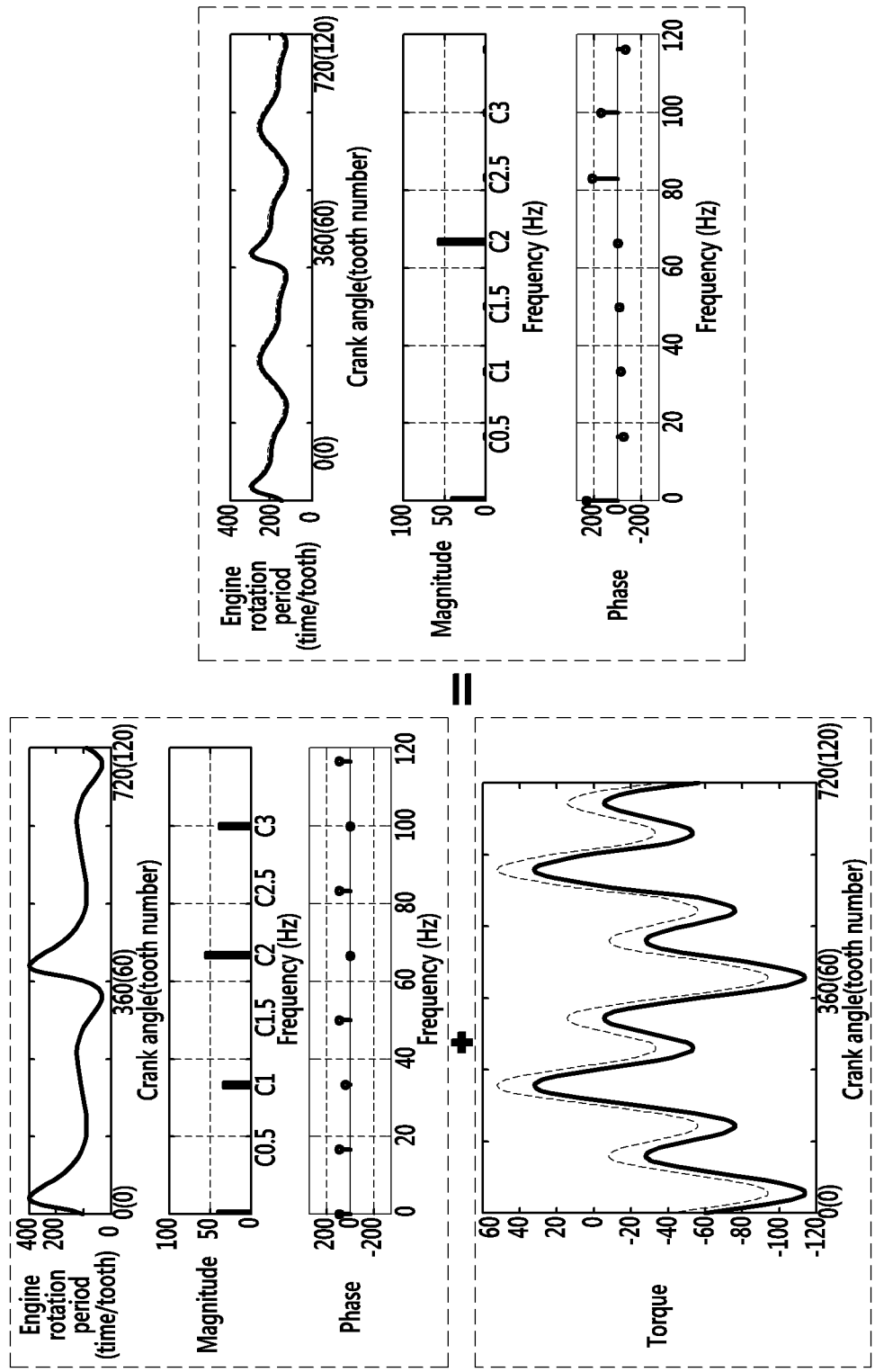
FIG. 3 is a drawing illustrating vibration reduction to which a method for active vibration control of a hybrid electric vehicle is applied in case that an engine load is high.

FIG. 2 is a flowchart illustrating a method for active vibration control of a hybrid electric vehicle, and FIG. 3 is a drawing illustrating vibration reduction to which a method for active vibration control of a hybrid electric vehicle is applied in case that an engine load is high.

As shown in FIG. 2, an active vibration control method of the hybrid electric vehicle is started when the controller 60 selects the reference angle signal based on the signal of the position sensor 25 at step S100. That is, the controller 60 selects the reference angle signal according to information of positions of the engine 10 and the motor 30.

When the reference angle signal is selected in the step S100, the controller 60 generates the reference angle at step S110. The controller 60 may set up the reference angle by dividing by a number (m) of resolver poles based on information of the position of the motor 20, or may set up the reference angle between top dead center (TDC) of the number one cylinder and bottom dead center (BDC) of the number four cylinder based on information of the position of the engine 10. For example, the controller 60 may select the reference angle based on the information of the position of the motor 20, and may create the reference angle by dividing 16 poles signal into eight (8).

After that, the controller 60 sets up a period of the FFT for performing analysis of the FFT at step S120. The controller 60 may set up the entire period in consideration of a cylinder and stroke of the engine 10. For example, if the engine 10 has four cylinders and four strokes, the crank angle may be 720 degrees.

When the FFT period is set up in the step S120, the controller 60 analyzes the FFT signal at step S130. That is, the controller 60 may calculate magnitude and phase information of each frequency by the FFT analysis.

In addition, the controller 60 sets up a reference spectrum according to the engine speed (engine rotation period) and the engine load at step S140. That is, the controller 60 may set up a vibration reference value of each frequency according to an operating point of the engine.

When the reference spectrum is set up in the step S140, the controller 60 extracts a vibration component of each frequency at step S150. That is, the controller 60 may select an object requiring vibration control in a compared result value of the FFT analysis and the predetermined vibration reference value.

As shown in FIG. 3, a magnitude and phase of vibration components of each frequency calculated by performing FFT analysis is illustrated in left upper side of the drawing.

When the vibration component of each frequency is extracted in the step S150, the controller 60 selects and adds a frequency to be removed from the vibration of each frequency, and performs inverse FFT to generate a reference signal at step S160.

In addition, the controller 60 determines a basic amplitude ratio according to the engine speed and the engine load and an adjustable rate according to the engine load at step S170. Herein, the basic amplitude ratio according to the engine speed and load may be determined in advance by a predetermined map. Also, the adjustable rate according to the engine load may be determined to decrease an anti-phase torque when the engine load is greater than or equal to a predetermined load.

As shown in FIG. 3, the anti-phase torque which overlaps the component of vibration to be removed is illustrated as a dotted line in left lower side of the drawing. Herein, if the engine enters to a high load region when the engine load is greater than or equal to a predetermined load, the adjustable rate may be set up such that the anti-phase torque is decreased in a negative direction as illustrated by a solid line.

That is, since vibration of the engine is decreased in a high load region, energy consumption can be reduced instead of decreasing effect of vibration reduction.

After that, the controller 60 performs active vibration control based on information of the amplitude ratio, the adjustable rate, and the engine torque at step S180. That is, the controller 60 may remove all the positive components and negative components of the vibration components by summing a reciprocal value found by multiplying the reference signal created by inverse FFT and the engine torque and the basic amplitude ratio and the adjustable rate.

As described above, according to the exemplary form of the present disclosure, the vibration may be actively controlled, because the exact vibration component of each frequency may be extracted through FFT frequency spectrum analysis. Therefore, since the determination system of the reference angle of the engine and the motor may be utilized as it is, an additional device or an algorithm for signal synchronization as used in the conventional art may be eliminated.

In addition, the adjustment amount of vibration and frequency which is the object of the vibration control may be controlled individually, it is possible to inhibit inefficient energy consumption which is from the control when the vibration is over-removed. Particularly, energy consumption during a high load region of the engine can be reduced by decreasing an anti-phase torque comparing to a low load region of the engine. Thus, precise and efficient active control may be performed through the feedback control in real time.

While this present disclosure has been described in connection with what is presently considered to be practical exemplary forms, it is to be understood that the present disclosure is not limited to the disclosed forms. On the contrary, it is intended to cover various modifications and equivalent arrangements included within the spirit and scope of the present disclosure.

What is claimed is:

1. A method for active vibration control of a hybrid electric vehicle, the method comprising:
    selecting a reference angle signal by a controller based on position information detected by a position sensor, the position information including motor position information detected from a motor or engine position information detected from the engine;
    generating, by the controller, a reference angle corresponding to the reference angle signal;
    setting, by the controller, a period for applying a fast Fourier transform (FFT) based on an engine attribute of the engine;
    after the period for applying the FFT is set, analyzing, by the controller, a FFT signal based on performing the FFT on an engine speed or a motor speed during the period, the FFT signal comprised of a plurality of frequency components;
    determining a reference spectrum covering the plurality of frequency components by the controller based on the engine speed and an engine load of the engine;
    extracting vibration components by the controller from the FFT signal based on the comparison of the FFT signal with the reference spectrum;
    selecting a removal object frequency by the controller from the extracted vibration components;
    determining a reference signal based on performing an inverse FFT on the selected removal object frequency;
    determining a basic amplitude ratio by the controller based on the engine speed and the engine load, and determining an adjustable rate based on the engine load; and
    performing active vibration control on each of the plurality of frequency components using the controller by summing values calculated from the basic amplitude ratio, the adjustable rate, an engine torque, and the reference signal.

2. The method of claim 1, wherein the reference angle is set by dividing by a number of resolver poles based on information of the position of the motor or set up the reference angle between a top dead center (TDC) of a number one cylinder and a bottom dead center (BDC) of a number four cylinder based on information of the position of the engine.

3. The method of claim 1, wherein the period is set based on engine attributes including a number of cylinders of the engine and a stroke of the engine.

4. The method of claim 1, wherein, in the step of analyzing the FFT signal, a magnitude and a phase of each of the plurality of frequency components are calculated.

5. The method of claim 1, wherein the extracted vibration components are removed by summing the reference signal obtained by performing the inverse FFT and the calculated values obtained by multiplying the engine torque and the basic amplitude ratio and the adjustable rate.

6. The method of claim 1, wherein the adjustable rate is determined to decrease an anti-phase torque when the engine load is greater than or equal to a predetermined load.

* * * * *